(12) United States Patent
Kim et al.

(10) Patent No.: US 6,975,796 B2
(45) Date of Patent: Dec. 13, 2005

(54) MODULATION FREQUENCY TUNABLE OPTICAL OSCILLATOR

(75) Inventors: Ho Young Kim, Daejeon-Shi (KR); Eun Soo Nam, Daejeon-Shi (KR); Kyoung Ik Cho, Daeeon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 129 days.

(21) Appl. No.: 10/749,145

(22) Filed: Dec. 31, 2003

(65) Prior Publication Data

US 2005/0084208 A1 Apr. 21, 2005

(30) Foreign Application Priority Data

Sep. 6, 2003 (KR) .................... 10-2003-0062415

(51) Int. Cl.⁷ .......................... G02B 6/34; G02B 6/26; H01S 3/30; H01S 3/082
(52) U.S. Cl. ...................... 385/37; 385/27; 372/94; 372/102; 372/6
(58) Field of Search .................. 385/15, 27, 31, 385/32, 37; 372/4, 6, 94, 102

(56) References Cited

U.S. PATENT DOCUMENTS

| | | | |
|---|---|---|---|
| 5,917,969 A | 6/1999 | Gavrilovic et al. | |
| 6,134,250 A | 10/2000 | Koren et al. | |
| H1926 H | 12/2000 | Carruthers et al. | |
| 6,374,006 B1 * | 4/2002 | Islam et al. | 385/15 |
| 6,608,949 B2 * | 8/2003 | Kim et al. | 385/27 |
| 2004/0086019 A1 * | 5/2004 | Kim et al. | 372/94 |

OTHER PUBLICATIONS

Henrik Ahlfeldt et al.; "20GHz Bandwidth of Lasers Flip-Chip-Mounted on Microstructured Carrers with Intgrated Electrical Waveguides"; ECOC'98, 20-24; Sep. 1998, Madrid, Spain; pp. 205-206.

Hiroaki Sanjoh et al.; "A Precisely Spaced Multiwavelength Light Source with a Pulsed Serrodyne Frequency Shifter in an Optical Ring Circuit"; Tunable And Multiwavelength Lasers 3.3.5., no date.

Ho-Young Kim et al.; "Millimeterwave frequency modulated lasers using the wavelength dependent birefringences inside the coupled fiber cavity"; P-7; pp. 125-129, no date.

* cited by examiner

Primary Examiner—Sarah Song
(74) Attorney, Agent, or Firm—Mayer, Brown, Rowe & Maw LLP (57) ABSTRACT

The present invention relates to a millimeter wave frequency band optical oscillator used for an oscillating frequency signal source of millimeter waves transmitted from a repeater to a wireless subscriber in a millimeter wave wireless subscriber communication system for a next-generation (i.e., 5th generation or less) very high speed wireless internet service, wherein a loop mirror and a pair of optical fiber grating mirrors are used. A wavelength fixed type and a wavelength tunable type optical fiber grating mirrors are connected in a serial manner to constitute a dual laser mode resonator capable of simultaneously oscillating two laser modes, which are appropriate to each wavelength. Therefore, it is possible to obtain a laser light source capable of an extremely high frequency (60 GHz or more) modulation by using beat phenomena between two laser modes.

6 Claims, 5 Drawing Sheets

MODULATION FREQUENCY TUNABLE OPTICAL OSCILLATOR

BACKGROUND

1. Field of the Invention

The present invention relates to a millimeter wave frequency band optical oscillator used for an oscillating frequency signal source of millimeter waves transmitted from a repeater to a wireless subscriber in a millimeter wave wireless subscriber communication system for a next-generation high speed wireless internet service and, more particularly, to a modulation frequency tunable optical oscillator capable of generating a dual laser mode by using a loop mirror and a pair of optical fiber grating mirrors.

2. Discussion of Related Art

Researches and developments of a communication technology using millimeter wave bands have been made in international and domestic communication technology institutes in order to provide subscribers with a service of high capacity data of about 100 Mbps by using a next-generation (i.e., 5th generation or less) personal wireless communication technology. In the millimeter wave band, the wireless communication should be serviced within a relatively short distance of about 200 m or less due to their high atmosphere attenuation. Therefore, subscribers should be located in the vicinity of a repeater, and extremely high frequency optical signals of a millimeter wave band are used to send information to the repeater via optical waveguides. In this case, an extremely high frequency optical oscillator is used for a signal source of oscillating frequencies for generating extremely high frequency optical signals.

Since five or six years ago, researches and developments of international or domestic technologies of this field have been focused on two modulation types, a semiconductor optical modulation for an extremely high frequency and a resonator-self modulation. In the semiconductor optical modulation type, a frequency band of 40 GHz or less is used, whereas in the resonator-self modulation type, a frequency band of 60 to 80 GHz is used to develop an optical fiber oscillator having a complex resonator structure.

According to Korean Patent Application No. 2002-3529, filed in Jan. 22, 2002, a ring resonator having a fiber optical grating mirror was proposed. Also, a laser light source capable of generating an extremely high frequency based on the ring resonator structure was developed by using the similar concept.

Figure 1:
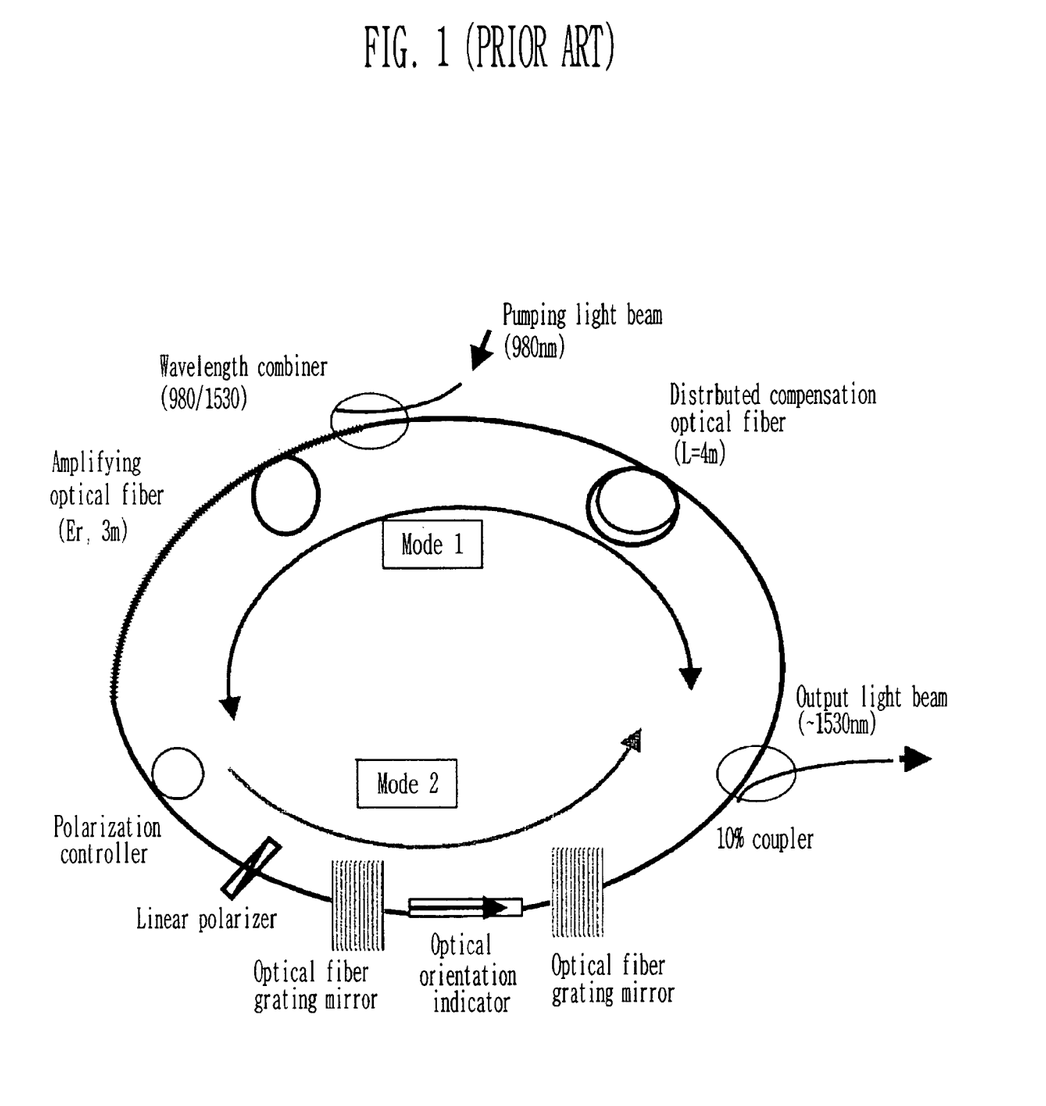
FIG. 1 is a schematic diagram showing a modulation frequency tunable optical oscillator using a conventional optical fiber ring resonator.

FIG. 1 is a schematic diagram showing a modulation frequency tunable optical oscillator using an optical fiber ring resonator, which comprises an amplifying optical fiber of 3 m for amplifying light beams, a polarization controller, a linear polarizer for changing optical wavelengths, an optical fiber grating mirror, an optical orientation indicator for isolating optical paths, an optical fiber grating mirror, a 10% coupler for obtaining output light beams of 1,530 nm or less, and a distributed compensation optical fiber of 4 m for generating non-linear polarization effects.

However, according to the conventional optical oscillator described above, since a laser mode 2 in which a light beam travels round a pair of optical fiber grating mirrors has a double resonant length in comparison with a laser mode 1 in which a light beam passes through them, so that birefringence and high variation of the resonant frequency happen. As a result, the frequency for modulating two modes becomes high but the width needed to adjust the polarization controller (polarized condition) becomes relatively narrow in order to oscillate two modes at the same time.

SUMMARY OF THE INVENTION

Accordingly, the present invention is directed to a high quality optical oscillator capable of oscillating in an extremely high modulation frequency of 60 GHz or more, which has not been commercialized yet.

According to a preferred embodiment of the present invention, there is provided a modulation frequency tunable optical oscillator, comprising: a wavelength combiner for receiving a pumping light beam having a predetermined wavelength; a loop mirror connected to one side of the wavelength combiner; an amplifying optical fiber connected to the other side of the wavelength combiner; a coupler connected to the amplifying optical fiber for an output light beam; and a pair of optical fiber grating mirrors connected to the coupler, wherein a light beam outputted from the amplifying optical fiber is reflected in the loop mirror with a different reflectance depending on each wavelength, passes through the amplifying optical fiber, and then is inputted to the optical fiber grating mirrors, whereby the optical fiber grating mirrors constitute a dual laser mode resonator in such a way that the light beams having different wavelength bands are reflected in the optical fiber grating mirrors, respectively.

Here, the wavelength combiner and the loop mirror are connected through a 50% coupler, and the loop mirror comprises a distributed compensation optical fiber and a polarization controller.

In addition, a pair of optical fiber grating mirrors include a wavelength fixed optical fiber grating mirror and a wavelength tunable optical fiber grating mirror, and a pair of optical fiber grating mirrors are arranged in a serial manner.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

The present invention will be described in detail by way of the preferred embodiment with reference to the accompanying drawings, in which like reference numerals are used to identify the same or similar parts.

Figure 2:
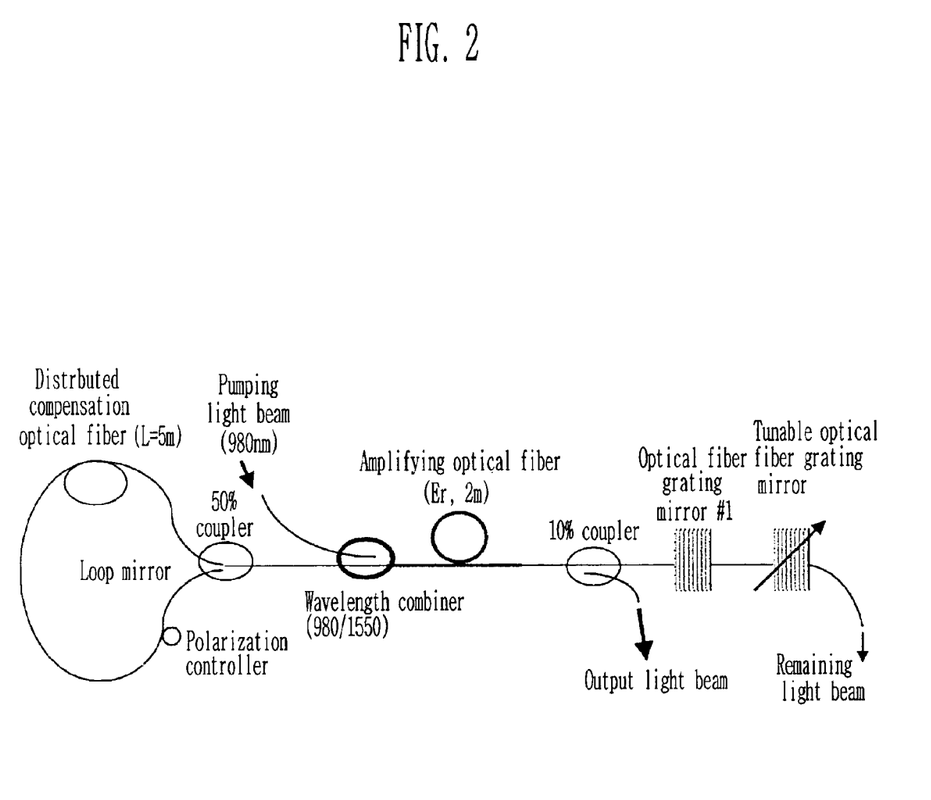
FIG. 2 is a schematic diagram for explaining a modulation frequency tunable optical oscillator according to the present invention.

FIG. 2 is a schematic diagram for explaining a modulation frequency tunable optical oscillator according to the present invention.

To one side of a wavelength combiner for inputting a pumping light beam having a wavelength of 980 nm, a loop mirror having a distributed compensation optical fiber (L=5 m) and a polarization controller are connected through a 50% coupler. To the other side of the wavelength combiner, an amplifying optical fiber (Er, 2 m) for amplifying a light beam and a 10% coupler for an output light beam are connected. In addition, a wavelength fixed optical fiber grating mirror and a wavelength tunable optical fiber grating mirror are connected to the next terminal in a serial manner.

The loop mirror is a circuit designed to connect output ports of a 2×2 optical fiber coupler to optical fibers having appropriate lengths so that the input light beam can be divided by 50% and then travel round the optical fibers, respectively. Reflectance is defined as the ratio that the input light beam is coupled to the original port after traveling rounds the optical fibers. In this case, the coupling ratio is dependent on its polarization. If there is no birefringence in the optical fibers in the loop mirror, the light beam is coupled 100%, which corresponds to total reflection. However, if there is birefringence, the reflectance is reduced (e.g., >10%). In other words, the reflectance of the loop mirror is determined by the birefringence of the optical fibers included in the loop mirror.

The optical fiber grating mirror is a selective wavelength type mirror, which allows the refraction indices of core portions of an optical fiber waveguide to be periodically changed so that the light beam having a particular wavelength band determined by a predetermined period is reflected and the light beams having other wavelength bands are passed through. Since the optical fiber grating mirror is located in one side of the amplifying optical fiber, the light beam outputted from the amplifying optical fiber is reflected in the loop mirror with different reflectance depending on its wavelength. Then, the light beam is amplified in the amplifying optical fiber and inputted to the optical fiber grating mirror. As a consequence, it is possible to form a resonator in which only the light beam reflected in the optical fiber grating mirror can travel round because the light beam of a particular wavelength band is reflected in the optical fiber grating mirror and the light beams of other wavelength bands are passed through.

Meanwhile, if an additional optical fiber grating mirror is installed in the next terminal of the aforementioned optical fiber grating mirror, a predetermined wavelength band of the light beam passing through the first optical fiber grating mirror is reflected in the second optical fiber grating mirror to generate resonance and the remaining light beams are passed through. This makes it possible to generate a dual laser mode due to each of the resonances in the first and the second optical fiber grating mirrors. In other words, it is possible to independently generate a dual laser mode in one optical amplifier if the resonating condition of each optical fiber grating mirror is set to be different.

However, in this case, the generated two laser modes share the identical gain of the optical amplification medium. Therefore, the wavelength and the polarization of the optical fiber grating mirror should be appropriately selected, and it is necessary to keep in mind that the reflectance of the loop mirror depends on irregular birefringence in the optical fibers. Therefore, it is possible to obtain a light source having a wide range of frequency of 20 to 70 GHz when the reflectance is analyzed depending on birefringence, and then the grating mirror is fabricated to be appropriate to the analyzed reflectance so that the two laser modes can be generated. In addition, it is possible to select two modulation frequency bands, 60 and 100 GHz, by adjusting the polarization controller to change polarization modes of the oscillated lasers.

Figure 3:
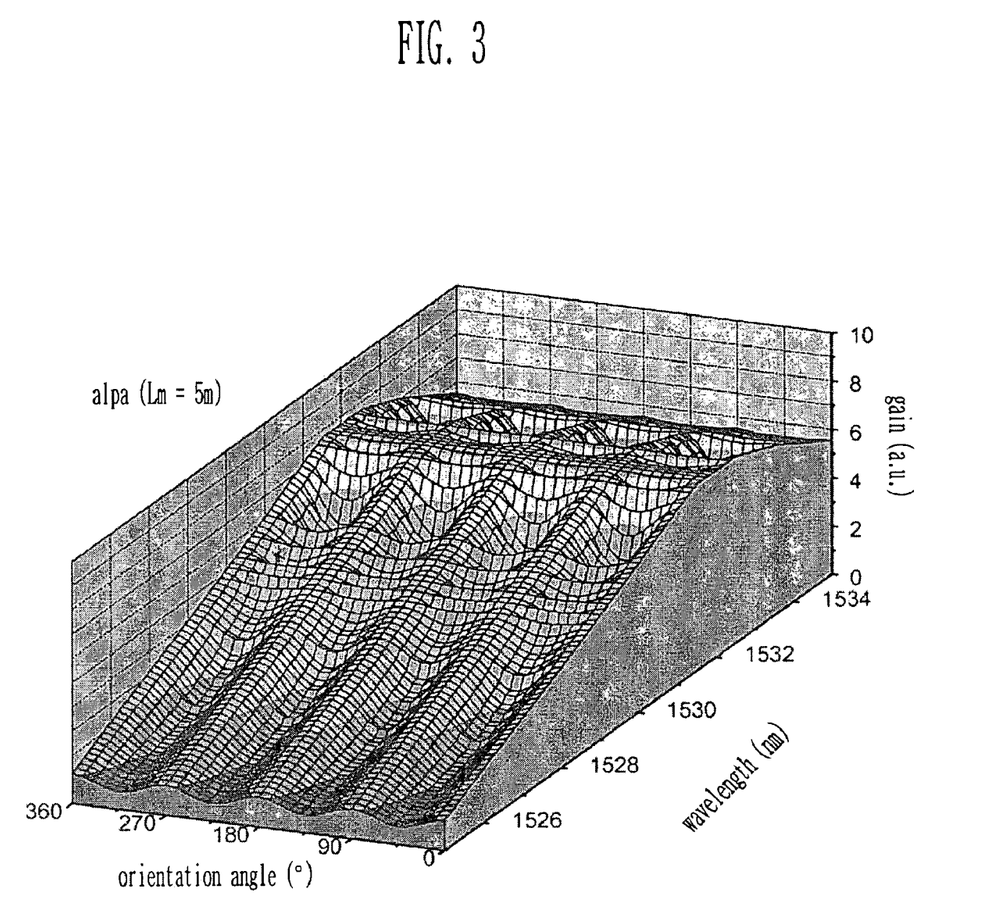
FIG. 3 is a graph showing the gains obtained by adjusting a polarization controller depending on the wavelength of light beam.

FIG. 3 is a graph showing the gains obtained by adjusting the polarization controller depending on the wavelength of the light beam. The gain curve of the amplifying optical fiber is dependent on a pumping optical power, and the reflectance of the loop mirror is dependent on the birefringence of the optical fiber in the loop mirror. As a result of simulating a total gain supposing the length (L) of the distributed compensation optical fiber is set to 5 m, the wavelength 980 nm, and the optical power 40 mW, it was possible to obtain the graph shown in FIG. 3, which shows that the gain curve of the amplifying optical fiber is similar to other structures of optical fiber resonators, and a maximum total gain can be obtained in a range of 1532 to 1533 nm. In addition, it is possible to see slight changes with a period of 90 degree by the polarization controller in the loop mirror.

Figure 4:
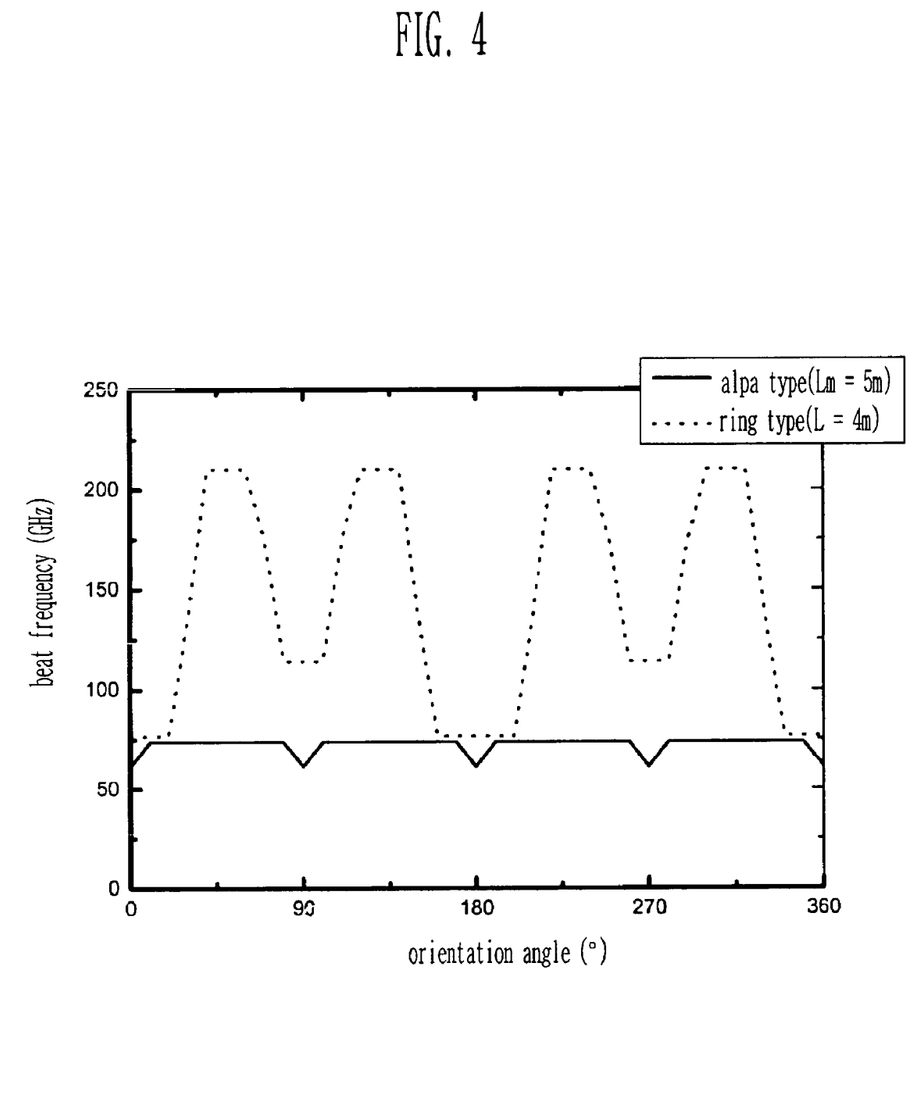
FIG. 4 is a graph showing changes of modulation frequencies depending on variation of an angle of a polarization controller.

FIG. 4 is a graph showing changes of modulation frequencies depending on variation of the angle in the polarization controller, which shows a result of simulating beat frequencies between two laser modes having a maximum gain. It is possible to see that the gain is not intensively influenced by changes of an orientation angle of the polarization controller in the loop mirror, and the beat frequency is low but stable in comparison with a unidirectional ring resonator structure.

Figure 5:
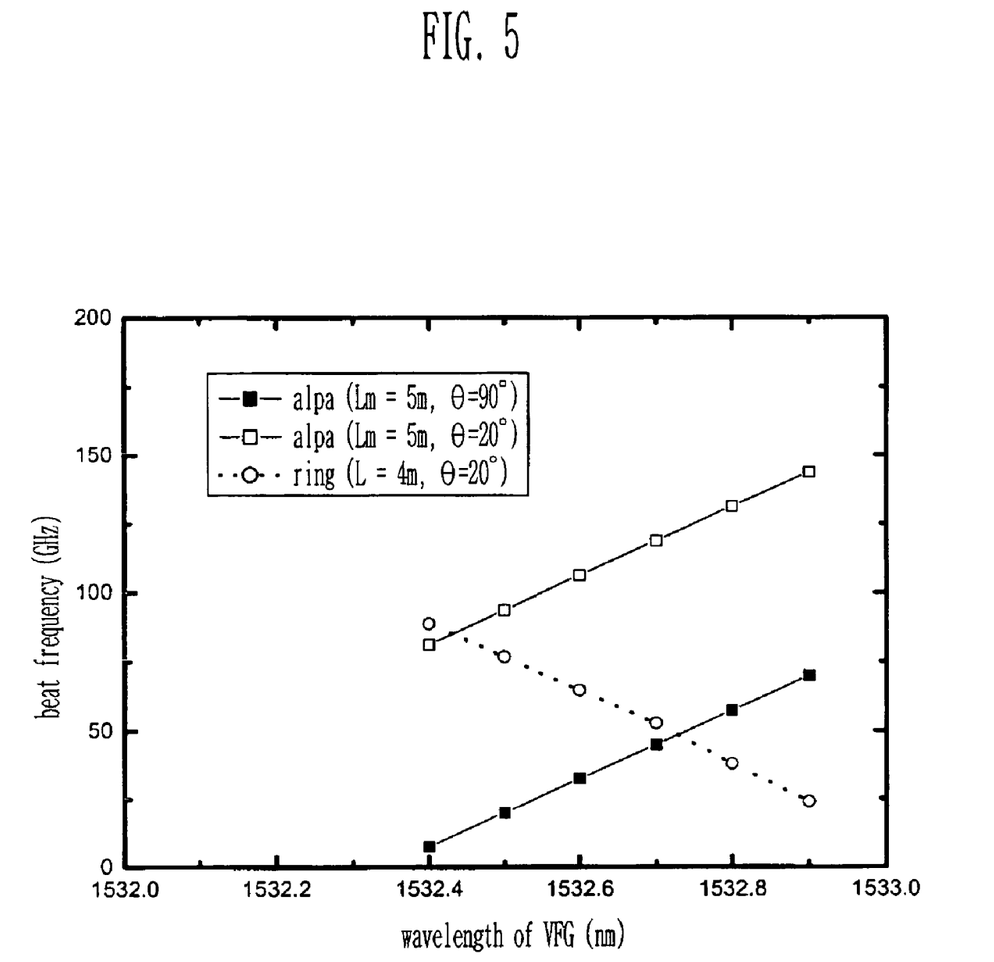
FIG. 5 is a graph showing changes of modulation frequencies of an optical oscillator depending on variation of a wavelength of a reflected light beam in an optical fiber grating mirror.

FIG. 5 is a graph showing changes of modulation frequencies of the optical oscillator depending on variation of the wavelength of the reflected light beam in the optical fiber grating mirror. The simulation was accomplished supposing that the first optical fiber grating mirror is fixed to have wavelengths of 1532.3 nm and 1531.8 nm, respectively, corresponding to a maximum gain obtained by the polarization controller, and the central wavelength of the reflected light beam changes from 1532.4 to 1533 nm by using the second tunable optical fiber grating mirror. As a result, as shown in FIG. 5, it was possible to obtain tunable frequency characteristics of 7 to 75 GHz and 80 to 145 GHz, respectively.

As described above, according to the present invention, since a dual laser mode is generated by using a loop mirror and a pair of optical fiber grating mirrors, it is possible to obtain optical output power modulated by an extremely high frequency due to the beat phenomena between the two laser modes and change wavelengths of reflected light beams in the tunable optical fiber grating mirror to change the modulation frequency of the output light beam. In other words, it is possible to oscillate an extremely high frequency laser of 60 GHz or more, which has been considered impossible to be implemented in the conventional optical oscillators, with a relatively simple structure by designing the optical oscillator in such a way that two laser modes can be simultaneously oscillated by using birefringence.

In addition, in comparison with the conventional optical fiber ring resonators, the oscillator according to the present invention is relatively less dependent on the birefringence in optical fibers and thus stable against polarization. Furthermore, it is possible to change the modulation frequency with convenient handling because it is designed to adjust just one tunable optical fiber grating mirror in order to overcome the technical difficulty that a pair of optical fiber grating mirrors should be correctly matched at the same time. Still furthermore, it is possible to lower the cost of manufacturing and implement more convenient structure of the optical oscillator because it does not use expensive components such as an orientation indicator or a polarizer.

The optical oscillator according to the present invention can oscillate a continuously variable modulation frequency of 7 to 75 GHz by adjusting the reflection frequency of the optical fiber grating mirror. Therefore, the optical oscillator according to the present invention can be used as an extremely high frequency optical signal generator, a frequency oscillator of an integrated optical-and-wireless millimeter wave communication device for an extremely high speed wireless internet service, etc., and adapted to core components in an extremely high speed wired optical transmission system. For these reasons, it is possible to obtain effect of import substitution and cost reduction.

Although the foregoing description has been made with reference to the preferred embodiments, it is to be understood that changes and modifications of the present invention may be made by the ordinary skilled in the art without departing from the spirit and scope of the present invention and appended claims.

What is claimed is:

1. A modulation frequency tunable optical oscillator, comprising:
    a wavelength combiner for receiving a pumping light beam having a predetermined wavelength;
    a loop mirror connected to one side of the wavelength combiner;
    an amplifying optical fiber connected to the other side of the wavelength combiner;
    a coupler connected to the amplifying optical fiber for an output light beam; and
    a pair of optical fiber grating mirrors connected to the coupler, wherein a light beam outputted from the amplifying optical fiber is reflected in the loop mirror with a different reflectance depending on each wavelength, passes through the amplifying optical fiber, and then is inputted to the optical fiber grating mirrors, whereby the optical fiber grating mirrors constitute a dual laser mode resonator in such a way that the light beams having different wavelength bands are reflected in the optical fiber grating mirrors, respectively.

2. The modulation frequency tunable optical oscillator according to claim 1, wherein the wavelength combiner and the loop mirror are connected through a 50% coupler.

3. The modulation frequency tunable optical oscillator according to claim 1, wherein the loop mirror comprises a distributed compensation optical fiber and a polarization controller.

4. The modulation frequency tunable optical oscillator according to claim 1, wherein the coupler is a 10% coupler.

5. The modulation frequency tunable optical oscillator according to claim 1, wherein a pair of optical fiber grating mirrors include a wavelength fixed optical fiber grating mirror and a wavelength tunable optical fiber grating mirror.

6. The modulation frequency tunable optical oscillator according to claim 1, wherein a pair of optical fiber grating mirrors are arranged in a serial manner.

* * * * *

EX PARTE REEXAMINATION CERTIFICATE (6363rd)

United States Patent
Kim et al.

(10) Number: US 6,975,796 C1
(45) Certificate Issued: Aug. 12, 2008

(54) MODULATION FREQUENCY TUNABLE OPTICAL OSCILLATOR

(75) Inventors: Ho Young Kim, Daejeon-Shi (KR); Eun Soo Nam, Daejeon-Shi (KR); Kyoung Ik Cho, Daeeon-Shi (KR)

(73) Assignee: Electronics and Telecommunications Research Institute, Daejeon-shi (KR)

Reexamination Request:
No. 90/008,594, Apr. 6, 2007

Reexamination Certificate for:
Patent No.: 6,975,796
Issued: Dec. 13, 2005
Appl. No.: 10/749,145
Filed: Dec. 31, 2003

(30) Foreign Application Priority Data

Sep. 6, 2003 (KR) .................. 10-2003-006415

(51) Int. Cl.
*G02B 6/34* (2006.01)
*G02B 6/26* (2006.01)
*H01S 3/30* (2006.01)
*H01S 3/08* (2006.01)

(52) U.S. Cl. ................. 385/37; 385/27; 372/6; 372/94; 372/102

(58) Field of Classification Search .............. 385/15, 385/27, 31, 32, 37; 372/4, 6, 94, 102
See application file for complete search history.

(56) References Cited

U.S. PATENT DOCUMENTS 5,778,014 A    7/1998  Islam ........................... 372/6

*Primary Examiner*—Kent T Nguyen (57) ABSTRACT

The present invention relates to a millimeter wave frequency band optical oscillator used for an oscillating frequency signal source of millimeter waves transmitted from a repeater to a wireless subscriber in a millimeter wave wireless subscriber communication system for a next-generation (i.e., 5th generation or less) very high speed wireless internet service, wherein a loop mirror and a pair of optical fiber grating mirrors are used. A wavelength fixed type and a wavelength tunable type optical fiber grating mirrors are connected in a serial manner to constitute a dual laser mode resonator capable of simultaneously oscillating two laser modes, which are appropriate to each wavelength. Therefore, it is possible to obtain a laser light capable of an extremely high frequency (60 GHz or more) modulation by using beat phenomena between two laser modes.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *